Patented Mar. 9, 1948

2,437,441

UNITED STATES PATENT OFFICE 2,437,441

COLORING METAL SURFACES

Linnaeus Joslyn Rogers, Toronto, Ontario, Canada, assignor to Associated Chemical Company of Canada Limited, Toronto, Ontario, Canada, a company of Canada No Drawing. Application February 14, 1945, Serial No. 577,928

4 Claims. (Cl. 148—6.15)

This invention relates to an improved process and composition of matter for coating the surface of a metal with a light absorbent film.

Processes for applying a light absorbent film or coating to the surface of a metal are relatively well known and widely used. Such coatings may be applied by the use of paint or lacquer, electrodeposition, or by chemical reaction. In the application of such a coating to the surfaces of metal articles in which manufacturing tolerances are extremely restricted, a built up coating, such as produced by a paint or lacquer or by electrodeposition, is not permitted due to the change in the dimensions of the article resulting from the built up coating. As a result, it is much preferred, if not essential, to obtain the coating by chemical reaction whereby the film is formed on the surface of the metal with negligible, if any, change in the dimensions in the article treated.

Heretofore, it has been difficult to obtain, by chemical reaction, a stable, evenly distributed, closely adherent, light absorbent film or coating of uniform texture to the surface of a metal.

Recently, a process has been developed for obtaining a film or coating to the surface of a metal by exposing the surface of the metal to reaction with an aqueous solution composed of sodium chlorite or potassium chlorite and a strong alkali such as sodium hydroxide or potassium hydroxide.

I have found that when a phosphate radical is present in a coloring solution composed of sodium chlorite or potassium chlorite and a strong alkali such as sodium hydroxide or potassium hydroxide a film is quickly formed on the surface of a metal. The film or coating is closely adherent, of smooth, uniform texture, is stable and can be exposed to severe weathering conditions without deterioration.

The selection of the compound of which the phosphate radical forms part and the concentration of the solution is dependent upon the desired color of the film and the composition of the surface exposed to reaction with the solution. For example, in treating copper or copper alloy parts used in optical instruments, buttons and many other articles in which light absorption is an essential requirement, a dense black surface is highly desired. Such a surface is obtained by the presence in the coloring bath of a phosphate salt of sodium or potassium selected from the group consisting of trisodium- or tripotassium-phosphate, sodium tetraphosphate, potassium tetraphosphate, hexametasodium- or hexameta- potassium-phosphate, pyrophosphates and polyphosphates in amount within the range of from about 0.5% to about 3% of the total weight of the chlorite and strong alkali used to form the coloring bath. The improvement appears to be one of degree in that improvement in the adherency, texture and distribution of the coating is apparent when only minute amounts of the phosphate radical are present in the bath but the dense black color is uniformly obtained only within the specified range.

The surface of the metal is cleaned and prepared by subjecting it to well known sulphuric acid-nitric acid dips, various concentrations of nitric acid and water, or etches containing chromic acid, chromates, or dichromates with sulphuric acid. The surface of the article, after treatment with the cleaning solution, is washed and then colored by immersion for a brief period in the solution of the present invention.

One of the requirements of the solution for blackening a copper or copper alloy is that a minimum pH must be exceeded. This minimum pH is that indicated by the concentration of an aqueous solution of sodium hydroxide or potassium hydroxide of about 10 grams per litre. This minimum limit is substantially constant, but varies slightly with the concentration of sodium chlorite and with the temperature.

It has been found that a highly satisfactory dense black coating can be obtained in aqueous solutions having concentrations ranging between the following limits: sodium chlorite—5 g./l., sodium hydroxide—10 g./l. to sodium chlorite— saturated solution, sodium hydroxide—1,000 g/l. with a phosphate compound present in the bath within the range of from about 0.5% to about 3% of the total weight of the chlorite and hydroxide present in the bath. The lower range of sodium chlorite-sodium hydroxide concentration requires approximately 30 minutes to blacken copper surfaces with the solution operating at approximately boiling point, whereas copper surfaces blacken in solutions of the high limits in approximately 1 minute when at approximately boiling points.

The concentration of the coloring solution and of the addition agent depend upon the type of metal being treated. For example, a film or coating having the desired characteristics, is obtained with articles having a high copper content with less addition agent than is required by articles having a lower copper content. As the copper content of the article lowers, increased amounts of addition agent are required to produce the desired dense black film. Also, the color of the film is dependent upon the concentration of the addition agent. For example, when concentrations above 3% of the weight of the sodium hydroxide are used, a brownish tinge is imparted to the film. This brown tinge may be corrected by reducing the concentration of the phosphate compound in the bath.

In normal commercial operation, the concentrations of the sodium chlorite, the strong alkali and phosphate radical are adjusted to produce a dense black coating on the article. A preparation which is very successful commercially comprises approximately 28% sodium chlorite, 2% trisodium phosphate, and approximately 70% sodium hydroxide. This mixture is used in the proportion of about 2½ pounds per gallon of water for a universal bath and as low as 1½ pounds per gallon for copper or high copper content alloys. The most satisfactory results are obtained when the process is operated at from about 200° F. to the boiling point of the solution.

In carrying out the process, the temperature required for the operation varies with the concentration of the component chemicals, high concentrations permitting lower temperatures to be used. By increasing the temperatures to approximately the boiling point of the solution, the time required to form the dense black surface is effectively reduced to a minimum.

The black surface produced by the process of the present invention is cupric oxide. While the process of the invention is based upon actual results which have been obtained and is independent of hypothetical considerations, a possible explanation of the mechanism of the reaction may be that although many chemical compounds are termed "insoluble" in some solvents, actually there is no such thing as complete insolubility. Black cupric oxide is one of the compounds termed as being insoluble in caustic soda. A satisfactory solution for the present process is about 15% sodium hydroxide, and at a temperature above 200° F. there is undoubtedly some solvent action on the cupric oxide as formed. When fresh, the solution is unsaturated with respect to any metal salts other than sodium. When a copper or brass article is immersed in the solution, oxidation of copper immediately takes place on the surface simultaneously with the dissolving action of the caustic soda. Thus there are two concurrent reactions, each tending to counteract the other. However, the oxidation of the copper is much faster than the dissolving action of the caustic solution, and the surface of the copper or copper alloy is blackened. As the bath is used, the solution tends to become more and more saturated with respect to the process of dissolving cupric oxide and copper and, therefore, the blackening or oxidation process proceeds with less interference so that the formation of the film on newly immersed articles becomes progressively faster as the bath is used to the limit which is reached when the decomposition of the chlorite destroys the effectiveness of the bath.

The present invention is not limited to coating articles of solid copper or copper alloys, but may be used to coat the surfaces of other metals which have been plated with copper or copper alloys when the coating thickness is greater than 0.00005".

The presence of the addition agent of the present invention in a coloring bath comprising sodium chlorite and a strong alkali, has many advantages. The film or coating is of a very fine texture which is evenly and uniformly distributed over the surface of the metal, and which is closely adherent thereto. A dense black coloring is obtained. The film or coating is formed in a very much shorter period of time than when using a bath containing sodium chlorite and a strong alkali, for example, a satisfactory coating is obtained in from 1 to 1½ minutes. Also, the presence of the phosphate radical appears to retard the decomposition of the chlorite in that the effective life of the bath is greatly extended.

It will be understood that modifications and departures may be made from the preferred embodiment of the invention described herein without departure from the scope of the invention as defined by the appended claims.

What I claim as new and desire to protect by Letters Patent of the United States is:

1. An aqueous solution for use in a bath for coloring copper or copper alloy surfaces consisting essentially of sodium chlorite and a hydroxide selected from the group consisting of sodium hydroxide and potassium hydroxide, and a phosphate salt selected from the group consisting of trisodium phosphate, tripotassium phosphate, sodium tetraphosphate, potassium tetraphosphate, hexametasodium phosphate, hexametapotassium phosphate, pyrophosphates and polyphosphates, the concentration of the hydroxide and sodium chlorite being between: sodium chlorite—5. g./l., hydroxide—10 g./l. to sodium chlorite—saturated solution, hydroxide—1,000 g./l. and the phosphate salt being present within the range of from about 0.5% to about 3% by weight of the chlorite and hydroxide.

2. A bath for use in coloring metal surfaces consisting essentially of a hot aqueous solution of sodium chlorite, a hydroxide selected from the group consisting of sodium hydroxide and potassium hydroxide, and a phosphate salt selected from the group consisting of trisodium phosphate, tripotassium phosphate, sodium tetraphosphate, potassium tetraphosphate, hexametasodium phosphate, hexametapotassium phosphate, pyrophosphates and polyphosphates, the phosphate salt being present within the range of from about 0.5% to about 3% of the total weight of the chlorite and alkali, the concentration of the hydroxide and sodium chlorite being between sodium chlorite—5 g./l., hydroxide—10 g./l to sodium chlorite—saturated solution, hydroxide—1,000 g./l.

3. The process of producing a black surface on copper or copper alloy surfaces which comprises immersing the surface in a hot, aqueous solution consisting essentially of sodium chlorite and an alkali selected from the group consisting of sodium hydroxide and potassium hydroxide, and a phosphate salt selected from the group consisting of trisodium phosphate, tripotassium phosphate, sodium tetraphosphate, potassium tetraphosphate, hexametasodium phosphate, hexametapotassium phosphate, pyrophosphates and polyphosphates, said solution having a concentration between sodium chlorite—5 g./l., sodium hydroxide—10 g./l., to sodium chlorite—saturated solution, sodium hydroxide—1,000 g./l., and the phosphate salt being present within the range of from about 0.5% to about 3% of the total weight of the chlorite and hydroxide.

4. A composition for use in coloring metal surfaces which consists essentially of about 70% of a hydroxide selected from the group consisting of sodium hydroxide and potassium hydroxide; about 28% of a chlorite selected from the group consisting of sodium chlorite and potassium chlorite; and from 0.5% to 3% of the total weight of the chlorite and hydroxide of a phosphate salt of sodium or potassium selected from the group consisting of trisodium phosphate, tripotassium phosphate, sodium tetraphosphate, potassium tetraphosphate, hexametasodium phosphate, hexametapotassium phosphate, pyrophosphates and polyphosphates.

L. JOSLYN ROGERS.

REFERENCES CITED

The following references are of record in the file of this patent:

UNITED STATES PATENTS

| Number | Name | Date |
|---|---|---|
| 2,077,450 | Weisberg et al. | Apr. 20, 1937 |
| 2,364,993 | Meyer | Dec. 12, 1944 |

OTHER REFERENCES

Hiorns, "Metal Colouring and Bronzing," publ. 1892 by MacMillan and Co., New York, pages 214 and 215.